Jan. 21, 1958 R. G. LE TOURNEAU 2,820,928
ELECTRICALLY CONTROLLED BRAKE UNIT
Filed Jan. 5, 1952 2 Sheets-Sheet 1

INVENTOR
ROBERT G. LE TOURNEAU
BY
Lyon & Lyon
ATTORNEYS

Jan. 21, 1958    R. G. LE TOURNEAU    2,820,928
ELECTRICALLY CONTROLLED BRAKE UNIT
Filed Jan. 5, 1952    2 Sheets-Sheet 2

INVENTOR
ROBERT G. LE TOURNEAU
BY
Lyon & Lyon
ATTORNEYS ic Office 2,820,928
Patented Jan. 21, 1958

2,820,928

ELECTRICALLY CONTROLLED BRAKE UNIT

Robert G. LeTourneau, Longview, Tex.

Application January 5, 1952, Serial No. 265,075

9 Claims. (Cl. 317—198)

This invention is directed to, and it is an object to provide an improved spring-engaged, electro-magnetically released solenoid brake unit and method for making certain parts thereof especially adapted, but not limited, for use on electric motors, the present application being a continuation in part of my pending application Serial Number 33,118, filed June 15, 1948, now abandoned.

An object of the invention is to provide an electrically controlled brake or solenoid unit, which embodies a novel electro-magnet assembly which is designed for ease of manufacture, and smooth, positive operation to release a brake against the action of springs.

A further object of the invention is to provide an electrically controlled brake unit, which includes a simplified but positive and accurate adjustment mechanism for the multiple brake disks of the unit.

An additional object of the invention is to provide an electrically controlled brake unit, which is especially adapted to be mounted in connection with, and supported by, one end wall of an electric motor in braking relation to the motor shaft.

Another object of the present invention is to provide an improved method of fabricating a composite solenoid core especially useful in solenoid or brake assemblies.

A further object of the invention is to provide a practical and reliable brake unit, and yet one which will be exceedingly effective for the purpose for which it is designed.

Still another object of the present invention is to provide an improved solenoid particularly useful in three phase brake system.

Still another object of the present invention is to provide an improved solenoid of this character in which six equally angularly spaced coils are provided so that diametrically opposed ones of said coils may be connected in pairs to different phases of a three phase system.

Yet another object of the present invention is to provide an electromagnet assembly particularly useful in three phase brake assemblies, so that equally spaced coils 6 in number or multiples of 3 can be arranged with each phase connected to 2 or more circumferentially equally spaced coils to give an even pull on all sides at all times.

Still a further object of the present invention is to provide an improved electromagnetic control assembly which utilizes a plurality of pole or core members with associated intermediate or bridge elements, such bridge or intermediate elements serving to provide a common flux path for flux produced in adjacent core or pole elements.

Still another object of the present invention is to provide an improved electromagnetic control assembly for operation by alternating currents without the necessity of using shading coils and the like in avoiding chatter or hum.

Still a further object of the present invention is to provide improved electromagnetic control assembly involving alternately arranged core or pole elements between which are interposed intermediate or bridge elements, with adjacent core members being energized with current flowing in different phases of a multi-phase system and with such intermediate bridge elements serving as a flux path for flux produced by current in a plurality of phases.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 4:
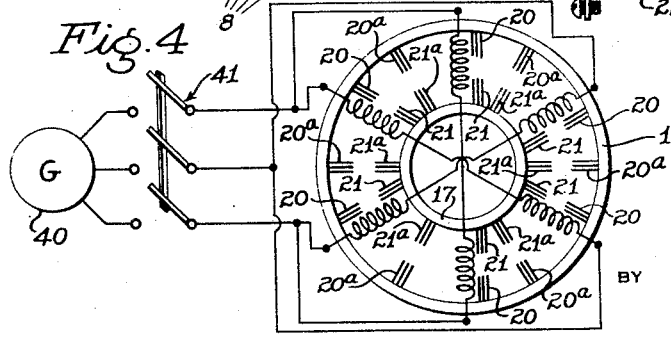

Figure 4 repersents in schematic form a three phase circuit in which the coils of the arrangement shown in the previous figures are connected.

Figure 1:
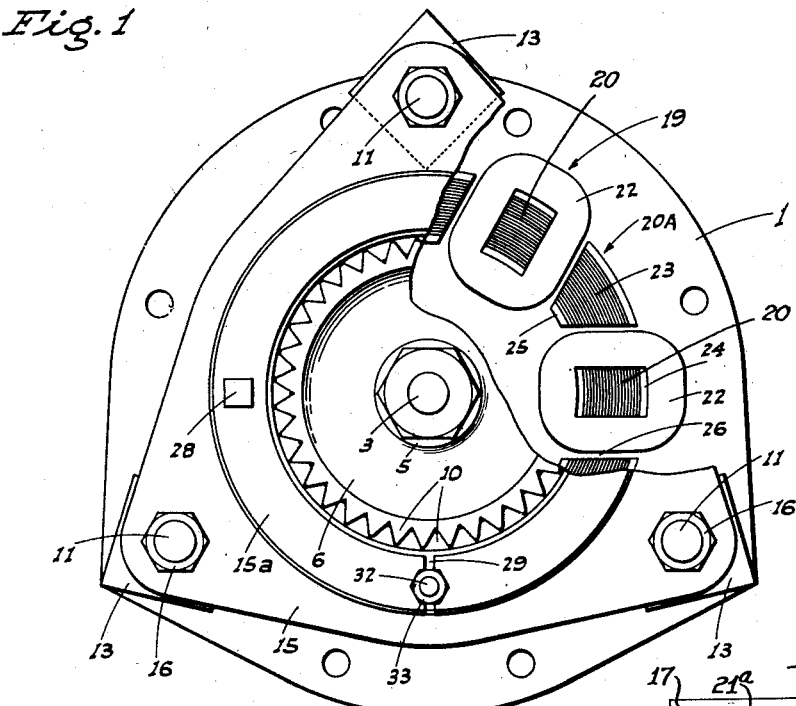
Figure 1 is an outer end view, partly broken away, of the brake unit.
Figure 5:
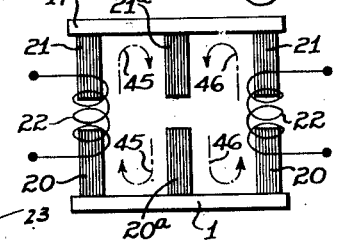

Figure 5 serves to illustrate the flow of magnetic flux through the intermediate or bridging pole elements.

Referring now more particularly to the characters of reference on the drawings:

The brake unit is especially designed to be mounted in connection with, and supported by, one end wall 1 of an electric motor cage 2, which wall will be hereinafter defined as the inner end wall and which, as described more fully later, comprises a permeable base member having three pairs of pole or core elements 20 and associated bridge or intermediate elements 20A fixed to its planar face in conductive relationship thereto to project substantially normal thereto in a circular series.

The electric motor shaft 3 projects through a bearing unit 4 carried in a supporting cage 4a which is secured to the inner end wall 1 by welding or other conventional means and such shaft extends some distance outwardly from the bearing unit.

Outwardly of the inner end wall 1 the shaft 3 projects in keyed relation to and through the hub 5 of an enlarged rotary bell or carrier 6 disposed in the main axially outwardly of said hub 5.

A multiple brake disk assembly, indicated generally at 7, surrounds the enlarged rotary bell or carrier 6 and said assembly includes, in alternate relation, rotatable brake disks 8 and non-rotatable brake disks 9.

The rotatable brake disks 8 are connected, at their inner periphery, by a saw tooth spline connection 10 between the disks and carrier 6 whereby said disks 8 are slidable axially of the carrier 6, but must rotate therewith. The non-rotatable brake disks 9 are of greater diameter, extending radially outwardly beyond the disks 8, and there axially slidably engage on a plurality of equally circumferentially spaced, longitudinal spindles 11. With this manner of mounting the brake disks 9 each are free to move axially but are positively restricted against rotation.

At their inner ends the longitudinal spindles 11 are threadingly connected, as at 12, to rigid backing plates 13 mounted in connection with the inner end wall 1 by blocks 14.

At their outer ends and axially outwardly of the multiple brake disk assembly 7, the longitudinal spindles 11 carry in fixed relation an outer end wall 15 secured in place by nuts 16 which clamp the end wall 15 against shoulders 16a on the spindles. This outer end wall includes an adjustment ring 15a which serves as the stop for the outer end of the multiple brake disk assembly 7.

The multiple brake disk assembly 7 includes at its axially inner end and as one of the non-rotatable brake disks 9 a floating inner brake disk, indicated generally at 17, and heavy-duty compression springs 18 surround the spindles 11 between the backing plates 13 and said floating inner brake disk 17. With this arrangement the springs 18 normally tend to axially compress the multiple brake disk assembly 7, whereby to impose a braking action on the carrier 6, and consequently on the motor shaft 3. The brake disk 17, similar to end wall 1 comprises a permeable base member having three pairs of pole or core elements 21 and associated bridge or intermediate elements 21A fixed to its planar face in conductive relationship thereto to project substantially normal thereto in a circular series.

The multiple brake disk assembly is adapted to be electrically controlled or released by means of the following novel electromagnet assembly:

An annular row of electromagnets, indicated at 19, is disposed in surrounding, concentric relation to the hub 5, but is spaced outwardly thereof. Each of such electromagnets 19 includes a stationary armature core 20 affixed to the inner end wall 1; a movable armature core 21 fixed to the floating inner brake disk 17; and a coil 22 which surrounds adjacent end portions of the armature cores 20 and 21, being fixed to the former. There is an air gap, as shown, existent between adjacent ends of the armature cores 20 and 21 of each electro-magnet 19. Such electromagnets 19 are wired together in a circuit shown in Figure 4 for simultaneous energization by a three phase source, and when this occurs the movable armature cores 21 are drawn axially inwardly, i. e., toward the stationary armature cores 20, which relieves the multiple disk brake assembly 7 from the force of the springs 18, permitting of unbraked rotation of the carrier 6 and the motor shaft 3. Upon deenergization of the magnets 19 the springs 18 act automatically and instantaneously to urge the floating inner brake disk 17, with the armature cores 21 thereon, in an axially outward direction, so as to then reimpose the compression force on the multiple brake disk assembly 7 and to cause a braking action.

The annular and concentric rows of armature cores 20 and 21 and associated bridge or intermediate cores 20A and 21A are formed in connection with the inner end wall 1 and the floating inner brake disk 17 respectively, in a novel manner. The core members 20, 21 on adjacent disks 1, 17 lie on the circumference of a circle and are preferably rectangular in cross section to accommodate coils 22 with rectangular "windows" thereon whereas the associated intermediate or bridge members 20A, 21A are generally trapezoidal in cross section so as to bridge the distance between adjacent coils 22. It will be observed from the decription herein that the inner brake disk 17 moves relative to the stationary disk 1 and each have circularly wound laminated structures 21, 21A and 20, 20A thereon respectively which are each of the same mean diameter and which are axially aligned, with the central axis of each of said laminated structures being coincident with the rotational axis of shaft 3; each of such ring shaped laminated structures 21, 21A on the one hand, and 20, 20A on the other hand are uniformly discontinuous along the length thereof and are each defined by a series of at least three pairs of spaced core portions 21, 20 and intermediate or bridge portions 21A, 20A respectively, with adjacent bridge portions 21A, 20A aligned longitudinally and with coils 22 encircling adjacent aligned ends of core portions 20, 21.

As the arrangement of core and bridge portions on the inner and outer brake disks 17 and 1 are identical a description of the method of making and mounting the armature cores 21 and associated bridge portions 21A on the floating brake disk 17 will suffice for the purpose of illustration.

Figure 2:
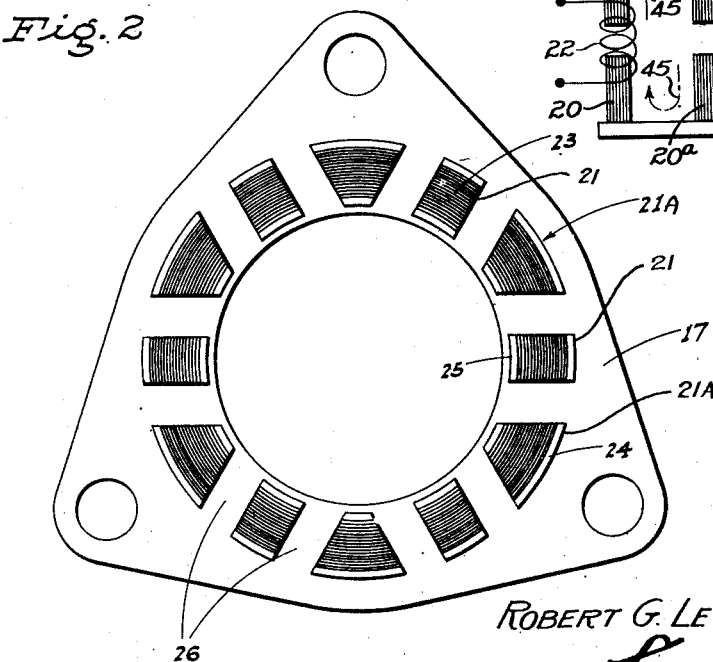
Figure 2 is a face view of the floating inner brake disk, detached.
Figure 3:
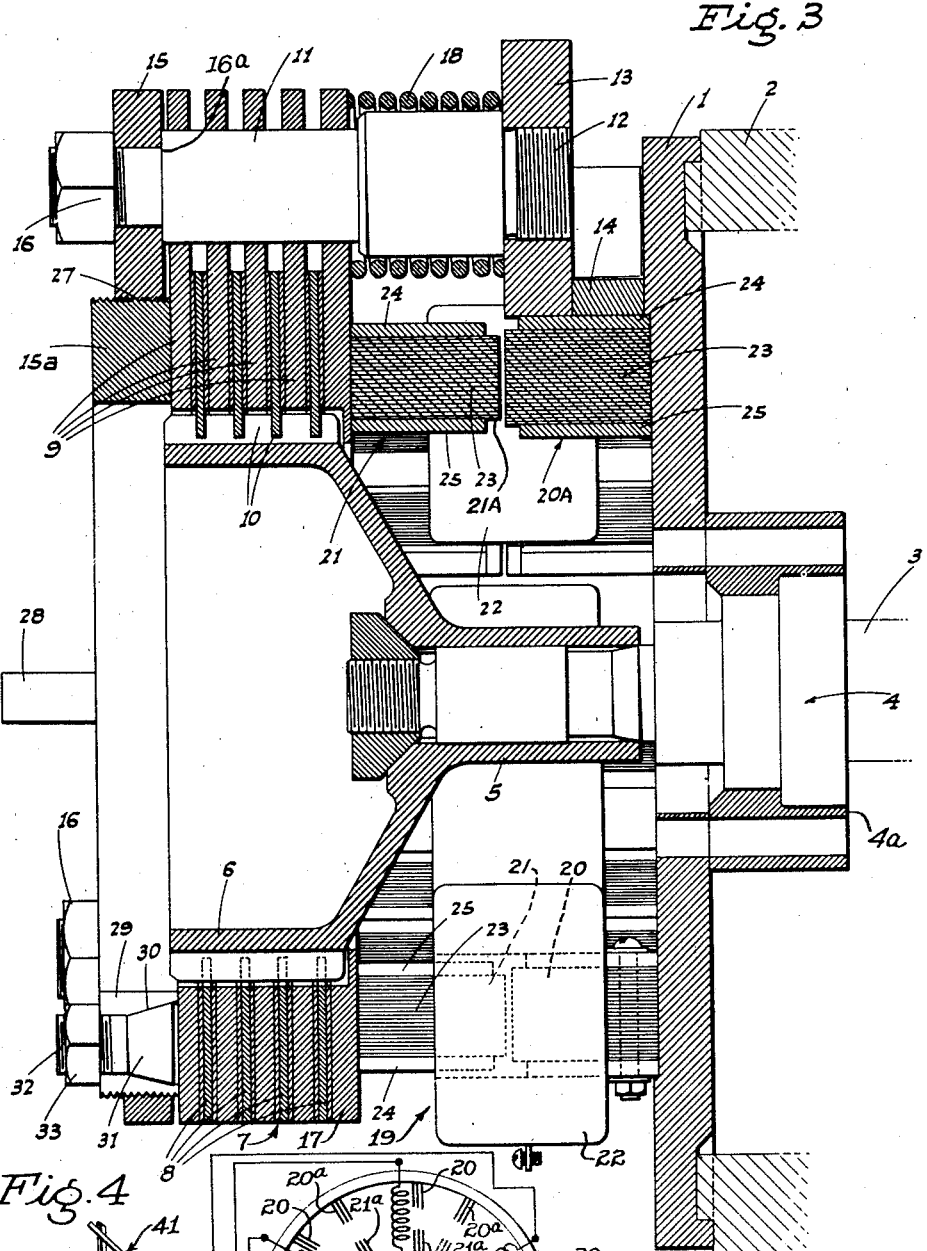
Figure 3 is an enlarged diametrical section of the brake unit.

By reference especially to Figures 2 and 5, the armature cores 21 and associated bridge portions 21A each comprise a multiplicity of concentric annular lamination bands 23 reinforced by and fixedly engaged between annular inner and outer retention bands 25 and 24.

At the outset the lamination bands 23, together with the retention bands 24 and 25, are continuous, i. e., spirally wound in circular form, and are secured together in tight, unitary relation. Thereafter, this assembly is located on the floating brake disk 17 and is welded in place between retention bands 25 and 24, and then machined on its outer end or face, followed by machining or transverse cutting of the same to form slots 26 to provide the alternately arranged armature cores 21 and intermediate or bridge cores 21A. The armature cores 20 and intermediate or brodge cores 20A, formed in like manner, have the coils 22 mounted on alternate ones thereof, as shown.

The adjustment ring 15a is threaded as at 27 into the outer end wall 15 and said ring is provided externally with opposed outwardly projecting pins 28 which may be engaged or driven to rotate the ring 15a to effect adjustment of the multiple brake disk assembly. In this manner adjustment to tighten or relieve the assembly 7 can be accomplished readily, and without the necessity of any special tools.

Normally the adjustment ring 15a is maintained locked against rotation by means of the following device:

At one point in its circumference the adjustment ring 15a is split radially as at 29 and a taper bore 30 extends through the ring parallel to its axis in the plane of said split. In other words, the split 29 intersects the taper bore 30. A taper plug 31 is engaged in the taper bore 30 and includes a stem 32 projecting out of the opposite or outer end of the ring, and a nut 33 is threaded on said stem. Upon tightening of the nut 33, the stem 32 and taper plug 31 are drawn outwardly, effecting an expansion of the ring 15a on opposite sides of the split 29 whereby to frictionally lock up said ring in any selected position of adjustment. In this manner the ring is normally held against accidental loosening with consequent maladjustment of the multiple brake disk assembly 7.

Figure 4 is a schematic representation of the circuit in which the coils 22 are interconnected. All of the coils are simultaneously energized with current flowing from the three-phase generator 40 upon closure of the three-pole single throw switch 41. Whereas, as described above, the permeable base members 1 and 17 actually comprise flat disks, for purposes of illustration and explanation, these elements 1 and 17 are represented as being circular so that the angular spacing of the various coils may be best represented. Of importance, is the fact that diametrically opposed coils are supplied with current from the same phase of the three-phase generator but with different diametrically opposed coils connected to different phases as illustrated. Although Figure 4 shows diametrically opposed coils as being serially connected to the same phase, these coils if desired may be connected in parallel with each other in the same phase. It should be understood that Figure 4 represents one way in which the electromagnetic control assembly may be used and in fact has been used to advantage in a three-phase system.

It is clear, that the intermediate or bridge portions 20A, 21A serve to convey flux developed in different phases with the permeable base members 1 and 17 serving as an element of the magnetic pair. This flux division is more clearly illustrated in Figure 5 wherein the arrows 45 represent the flow of flux developed as a result of current flowing through the lefthand winding 22 connected to a particular phase of a three-phase system, while the other arrows 46 represent the flux produced as a result of current flowing through the righthand winding 22 which is connected to a different phase of the three-phase system. These fluxes represented by the arrows 45 and 46 traverse a common flux path which includes the intermediate or bridging poles or core elements 20A and 21A. In this respect it should be observed that while, for example, at one particular instant in the cycle of alternating current, the flux threading the lefthand aligned core members 20 and 21 in Figure 5 may be zero, the net flux threading the aligned bridging poles 21A and 20A has some finite value so that at such instant the flux flowing through the aligned bridging poles 20A, 21A serves to minimize the possibility of chatter or hum in the assembly.

While the drawings show a magnetic structure using six coils, certain features of the present invention may be practiced using nine equally spaced coils, fifteen equally spaced coils, twenty-one equally spaced coils, etc., as well as six and multiples thereof.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. An electromagnetic control assembly which includes a pair of relatively movable members, each of said members having mounted thereon in adjacent spaced relationship, circularly wound ring shaped laminated structures which are each of the same mean diameter and which are axially aligned, with the central axis of said laminated structures on each member being coincident, each of said ring shaped laminated structures being uniformly discontinuous along the length thereof and being defined by a series of at least three pairs of spaced core and bridge portions, said spaced core and bridge portions on adjacent structures being aligned longitudinally, magnetizing coils surrounding a corresponding core portion on each member, and with the bridge portions bridging the gap between adjacent coils.

2. An electromagnetic control assembly which includes a pair of relatively movable elements for retarding the motion of a rotating shaft, a series of core members and bridge members alternately arranged on each of said elements on the circumference of a circle, said core members and bridge members each comprising a plurality of arcuate laminations having their center of curvature lying on the axis of rotation of said shaft, a magnetic coil surrounding aligned core members on each element, with the bridge members on each element bridging the gap between adjacent coils.

3. The arrangement set forth in claim 2 in which one of said elements has affixed thereto an outer ring which is internally threaded and which is concentrically mounted, and an adjustment ring threaded within said outer ring for adjusting the spacing between the core members on adjacent elements.

4. The arrangement set forth in claim 2 in which said core members and associated magnetic coils used are six in number or multiples of 3 so that magnetic coils equally spaced around the circumference may be connected to corresponding phases of a three-phase supply.

5. In an electro-magnetic control assembly for a brake unit, a permeable base member having a substantially planar face, at least three pairs of pole elements fixed to said face to project substantially normal thereto in a circular series, the elements of each pair being diametrically opposed and said pairs being uniformly angularly spaced, the said pole elements being in conductive contact with said base member and each having an energizing coil extending therearound.

6. In an electro-magnetic control assembly, a pair of permeable members arranged in spaced relationship along an axis, means connecting said members for relative movement along said axis while preventing relative rotation thereof about said axis, said members each having at least three pairs of pole elements fixed thereto and arranged to project in the direction of said axis to a position adjacent the ends of the pole elements on the other member, said pole elements being arranged concentrically about said axis, the poles of each pair being diametrically opposed and said pairs being uniformly angularly spaced about said axis, each of the poles of said pairs having an energizing coil therearound, and each of the said pairs of pole elements on one member being axially aligned with the pole elements of a corresponding pair on the other member.

7. In an electro-magnetic control assembly, a permeable base member having a substantially planar face, a plurality of pole elements fixed to said face in conductive contact therewith, said pole elements being substantially equally spaced apart and arranged concentrically about an axis normal to said face, each of said pole elements comprising a plurality of nested cylindrically curved laminations arranged with their curved surfaces substantially concentric to said axis, a curved edge of each of said laminations being in contact with said face.

8. An armature assembly comprising, with a plate having an axis, a band unit comprising, initially, a plurality of flat, annular lamination bands engaged in concentric relation to said axis and having annular retention bands on the inner and outer edges, means fixing the band unit to the plate, said band unit after affixed to the plate being slotted through transversely to form an annular row of separate armatures.

9. In an electro-magnetic control assembly, a pair of permeable members arranged in spaced relationship along an axis, means connecting said members for relative movement along said axis while preventing relative rotation thereof about said axis, said members each having at least three pairs of pole elements fixed thereto and arranged to project in the direction of said axis to a position adjacent the ends of the pole elements on the other member, said pole elements being arranged concentrically about said axis, the poles of each pair being diametrically opposed and said pairs being uniformly angularly spaced about said axis, each of the poles of said pairs having an energizing coil therearound, and each of the said pairs of pole elements on one member being axially aligned with the pole elements of a corresponding pair on the other member, at least six additional pole elements on each member between adjacent pole elements of said pairs, said additional pole elements on each member also extending axially to a position adjacent the end of a corresponding and axially aligned additional pole element on the other member, said additional pole elements having no coils therearound.

References Cited in the file of this patent

UNITED STATES PATENTS

| | | |
|---|---|---|
| 264,270 | Freeman | Sept. 12, 1882 |
| 823,958 | Murphy | June 19, 1906 |
| 1,527,162 | Alvard | Feb. 24, 1925 |
| 1,787,133 | Wilson | Dec. 30, 1930 |
| 1,968,583 | Apple | July 31, 1934 |
| 2,009,121 | Price | July 23, 1935 |
| 2,077,888 | Larsh | Apr. 20, 1937 |
| 2,158,252 | Polydoroff | May 16, 1939 |
| 2,247,655 | Fields | July 1, 1941 |
| 2,305,686 | Franz | Dec. 22, 1942 |
| 2,332,139 | Finnegan | Oct. 19, 1943 |
| 2,388,737 | Gotha | Nov. 13, 1945 |
| 2,421,757 | Oetzel | June 10, 1947 |
| 2,469,100 | Andrus | May 3, 1949 |
| 2,543,830 | Burrous et al. | Mar. 6, 1951 |

FOREIGN PATENTS

| | | |
|---|---|---|
| 573,421 | Great Britain | Nov. 20, 1945 |
| 1,056,919 | France | Mar. 3, 1954 |